United States Patent
Brand et al.

(10) Patent No.: US 7,842,115 B2
(45) Date of Patent: *Nov. 30, 2010

(54) OIL SEPARATOR ARRANGEMENT AND CYLINDER HEAD COVER FOR AN INTERNAL COMBUSTION ENGINE

(75) Inventors: Manfred Brand, Elmenhorst (DE); Artur Knaus, Hamburg (DE); Mathias Reibe, Wittenburg (DE)

(73) Assignee: Dichtungstechnik G. Bruss GmbH & Co., KG, Hoisdorf (DE)

( * ) Notice: Subject to any disclaimer, the term of this patent is extended or adjusted under 35 U.S.C. 154(b) by 388 days.

This patent is subject to a terminal disclaimer.

(21) Appl. No.: 12/017,442

(22) Filed: Jan. 22, 2008

(65) Prior Publication Data

US 2008/0179230 A1    Jul. 31, 2008

(30) Foreign Application Priority Data

Jan. 26, 2007    (DE) .................... 10 2007 004 955

(51) Int. Cl.
*B01D 45/12* (2006.01)

(52) U.S. Cl. .................. 55/459.1; 55/418; 55/419; 55/420; 55/484; 95/10; 95/22; 95/23; 123/572; 123/573; 123/574; 123/41.86; 123/198 E

(58) Field of Classification Search ........... 55/459.1, 55/418–420, 484; 123/572–574, 41.86, 198 E; 95/19, 22–23

See application file for complete search history.

(56) References Cited

U.S. PATENT DOCUMENTS

| | | | | |
|---|---|---|---|---|
| 2,952,330 | A * | 9/1960 | Winslow | 96/212 |
| 6,379,411 | B1 * | 4/2002 | Turner et al. | 55/394 |
| 6,684,864 | B1 * | 2/2004 | Busen et al. | 123/572 |
| 2003/0024512 | A1 * | 2/2003 | Kitano et al. | 123/572 |
| 2003/0075046 | A1 * | 4/2003 | Lenzing | 95/267 |
| 2003/0172632 | A1 * | 9/2003 | Matsubara et al. | 55/417 |
| 2004/0237484 | A1 * | 12/2004 | Altvater et al. | 55/345 |
| 2005/0188937 | A1 * | 9/2005 | Hilpert et al. | 123/90.38 |
| 2006/0102113 | A1 | 5/2006 | Tiller et al. | |
| 2006/0112941 | A1 * | 6/2006 | Hilpert et al. | 123/573 |
| 2006/0260589 | A1 * | 11/2006 | Shieh | 123/572 |
| 2007/0256566 | A1 * | 11/2007 | Faber et al. | 96/417 |

(Continued)

FOREIGN PATENT DOCUMENTS

DE    199 18 311 A1    11/2000

(Continued)

*Primary Examiner*—Jason M Greene
*Assistant Examiner*—Dung Bui
(74) *Attorney, Agent, or Firm*—Saliwanchik, Lloyd & Saliwanchik

(57) ABSTRACT

An oil separator arrangement for an internal combustion engine incorporates a vortex chamber oil separator with a vortex chamber extending in a longitudinal direction, where the vortex chamber includes a wall extending in a longitudinal direction, a gas inlet, and a gas outlet opening. The gas inlet is disposed tangential to the wall for tangentially blowing-in of blow-by-gas into the vortex chamber, so that at least one gas vortex flow rotating helically along the wall in the longitudinal direction is generated, where at least one further oil separator is connected in parallel to the vortex chamber oil separator. The further oil separator incorporates a separation chamber with an inlet-side spring tongue automatically controlled by the applied blow-by-gas, and a baffle wall disposed downstream the spring tongue.

25 Claims, 3 Drawing Sheets

U.S. PATENT DOCUMENTS

| | | | |
|---|---|---|---|
| 2008/0105494 A1* | 5/2008 | Lemke et al. | 184/6.23 |
| 2008/0142091 A1* | 6/2008 | Meinig et al. | 137/488 |
| 2008/0149065 A1* | 6/2008 | Brand et al. | 123/198 E |
| 2008/0196364 A1* | 8/2008 | Brand et al. | 55/290 |
| 2008/0295814 A1* | 12/2008 | Breuninger et al. | 123/572 |
| 2009/0120854 A1* | 5/2009 | Parikh et al. | 210/137 |
| 2009/0199826 A1* | 8/2009 | Meinig et al. | 123/573 |
| 2009/0314230 A1* | 12/2009 | Nagenkogl et al. | 123/41.44 |
| 2010/0043763 A1* | 2/2010 | Hilpert | 123/573 |

FOREIGN PATENT DOCUMENTS

| | | |
|---|---|---|
| DE | 102 05 981 A1 | 8/2003 |
| DE | 103 20 215 B4 | 12/2004 |
| DE | 10 2004 006 082 A1 | 8/2005 |
| DE | 10 2004 016 742 B3 | 9/2005 |
| DE | 10 2004 019 154 A1 | 11/2005 |
| DE | 10 2004 061 938 B3 | 6/2006 |
| DE | 10 2005 003 149 A1 | 8/2006 |
| DE | 10 2007 046 235 A1 | 6/2008 |
| EP | 1568861 | 8/2005 |
| EP | 1614871 A2 | 1/2006 |

\* cited by examiner

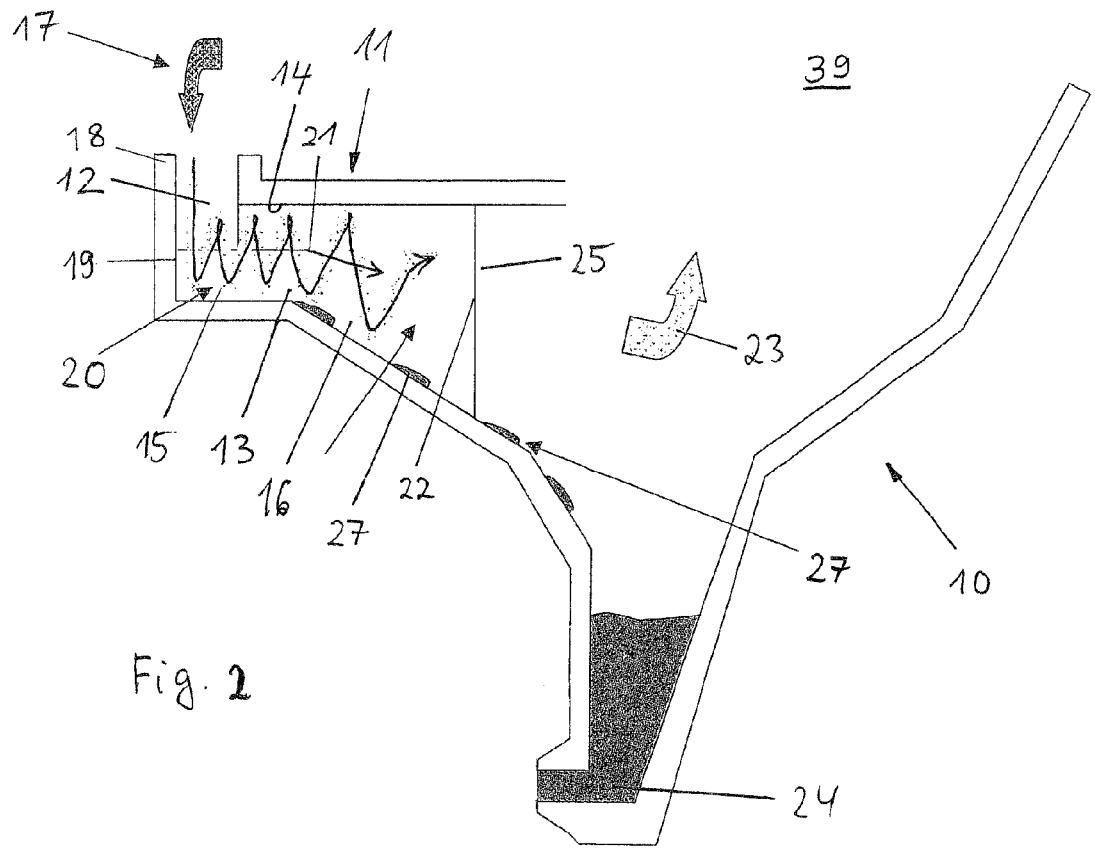
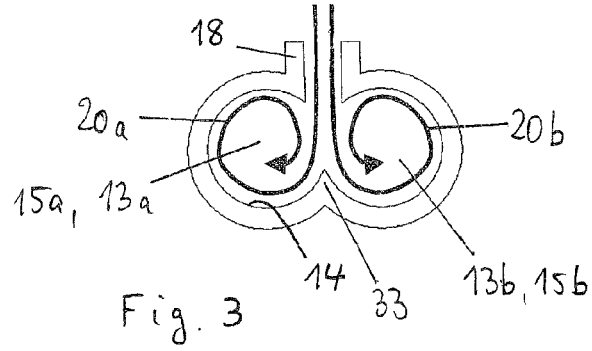
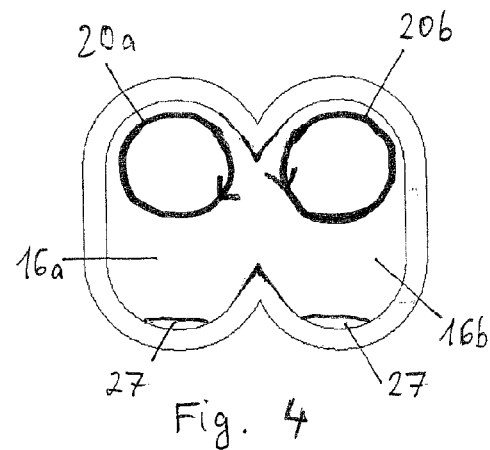

OIL SEPARATOR ARRANGEMENT AND CYLINDER HEAD COVER FOR AN INTERNAL COMBUSTION ENGINE

BACKGROUND OF INVENTION

The invention relates to an oil separator arrangement and a cylinder head cover for an internal combustion engine.

The parallel connection of oil separators and control of the partial volume flows as a function of the size of the total volume flow is known from DE 199 18 311 A1.

DE 10 2005 003 149 A1 discloses a plurality of oil separators connected in parallel, where closing means are respectively assigned to each oil separator. The closing means are triggered individually as a function of the total inflowing gas volume ascertained by means of a sensor.

DE 10 2004 019 154 A1 discloses an oil separating device with two identical cyclone separators connected in parallel, which can be switched on or off individually by means of a switch element as a function of the gas volume flow.

A cylinder-head cover with four cyclones connected in parallel is known from DE 10 2004 006 082 A1, wherein three cyclones each comprise a leaf spring with one end fixed, which covers the gas outlet opening of the immersion tube and stands under respectively different pretensioning, said leaf spring automatically switching on or off the corresponding cyclone as a function of the gas pressure by opening or closing an opening gap.

DE 102 05 981 A1 discloses an oil separator with a plurality of identical cyclone separators connected in parallel, the inlet openings of which can be controlled by means of a common slide valve, so that a different number of cyclone inlet openings is opened in the different slide-valve positions.

EP 1 614 871 A2 discloses an oil separating device with a plurality of cyclone separators connected in parallel, the inlet openings of which are opened to a differing extent as a function of the blow-by-gas pressure by means of a common leaf spring with one end fixed.

In the aforementioned documents, the required control elements for the oil separators give rise to additional production costs.

DE 103 20 215 B4 discloses an oil separating device with a plurality of identical oil separators connected in parallel, each oil separator comprising a cantilever leaf spring with one end fixed, said leaf spring automatically opening a gas inlet opening as a function of the pressure of the blow-by-gas present, and comprising a baffle wall disposed downstream.

DE 10 2004 016 742 B3 discloses an oil separator with an inlet-side leaf spring with one end fixed and a downstream diffuser. Oil particles are separated by inertia on account of the deflection of the gas at the wall surrounding the tip of the spring tongue.

DE 10 2004 961 938 B3 discloses an oil separating system with an oil separator designed as a leaf valve, a pressure control valve upstream of the oil separator and a bypass line for bridging the arrangement comprising pressure control valve and oil separator in the presence of inadmissibly high pressure in the crankcase.

The problem underlying the invention is to provide an oil separator arrangement and a cylinder head cover which achieve an effective oil separation over a large volume-flow range with simple means and in a compact design.

The invention solves this problem with the features of the independent claims.

BRIEF SUMMARY

The vortex chamber separator according to the invention is not controlled, i.e. free of elements for the controlled change of the flow, in particular free of corresponding switch elements or valves. In particular, the vortex chamber comprises an open gas inlet and an open gas outlet opening. On account of the free and unrestricted flow, the vortex chamber separator according to the invention exhibits only small pressure losses at low volume flows and ensures an effective separation especially in a range in which the spring tongue of the spring-tongue separator does not yet open.

The oil separator connected in parallel according to the invention with an inlet-side spring tongue and a downstream baffle wall exhibits, at higher volume flows when the spring tongue automatically releases an opening gap for the blow-by-gases on account of the raised gas pressure against the spring pretensioning, an approximately linear or at least non-exponentially increasing passage characteristic over a large volume-flow range. This is due to the fact that in the spring-tongue separator according to the invention no helically rotating gas vortices are generated that would cause a non-proportional or even exponential increase in the pressure loss at high volume flows. On account of the non-exponential flow characteristic, the spring-tongue separator automatically takes over the main load of the separation with increasing volume flow. The spring tongue is actuated directly by the blow-by-gas pressure present at the spring tongue and thus automatically opens or closes. An additional control element is not required.

According to the aforesaid, the parallel connection of a vortex chamber separator with a pressure loss which is small at low volume flows but which increases essentially exponentially, and a spring-tongue separator with a downstream baffle wall which exhibits a non-exponentially increasing pressure loss at higher flow rates, is characteristic of the invention. Additional control elements can be completely dispensed with on account of the free flow through the vortex chamber and the spring tongue switching automatically solely as a result of the applied blow-by-gas pressure.

For the spring-tongue separator according to the invention the arrangement of the spring-tongue valve at the gas inlet opening is essential, because the cross-sectional narrowing in the gap of the spring-tongue valve leads to a considerable acceleration of the through-flowing blow-by-gas, which enables an effective separation of oil particles at the baffle wall disposed behind the latter.

The spring-tongue oil separator according to the invention is made in a preferred embodiment according to German patent 103 20 215 B4, the contents of which are herewith incorporated in the present application by reference.

The vortex chamber separator according to the invention can be made according to German patent application 10 2007 046 235.4, the contents of which are herewith incorporated in the present application by reference. Accordingly, the gas outlet opening is preferably disposed in a distal region of the vortex chamber, wherein in the vortex chamber, due to the tangential gas inlet, a rotating, helical gas vortex is induced which extends from the gas inlet up to the distal end. For this purpose, the vortex chamber is expediently shaped essentially cylindrical, this term meaning a shape rounded in cross-section, for example oval or round, and including a cross-section changing over the length of the vortex chamber.

The invention, however, also includes a vortex chamber separator with helical or screw-shaped means such as for example helical faces or channels, or in the shape of a conventional cyclone separator with an immersion tube.

In a preferred embodiment of the invention, the oil separator arrangement according to the invention is integrated into a cylinder-head cover. The invention is not however restricted to this. One or more oil separators of the oil separator arrangement can also be disposed outside the engine block.

The invention is explained below with the aid of advantageous examples of embodiment making reference to the appended drawings.

In the figures:

FIG. 2 shows a cross-section through the vortex chamber oil separator from FIG. 1;

FIG. 3 shows a cross-section through the vortex chamber oil separator from FIG. 1 in the region of the gas inlet;

FIG. 4 shows a cross-section through the vortex chamber oil separator from FIG. 1 in the region of the diffuser;

DETAILED DISCLOSURE

Figure 1:
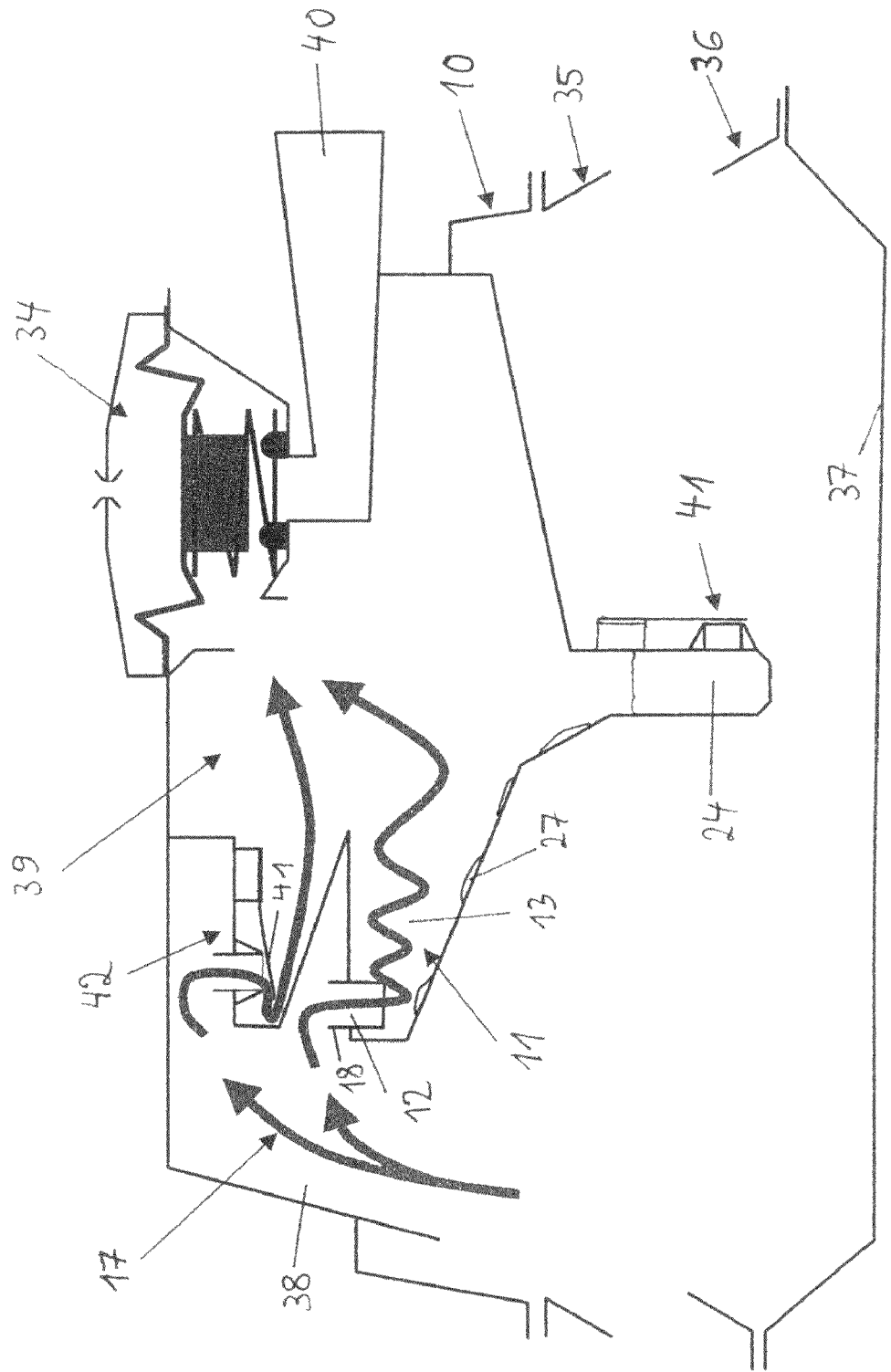
FIG. 1 shows a schematic cross-sectional view of an internal combustion engine.

The internal combustion engine shown in FIG. 1 comprises cylinder-head cover 10, cylinder head 35, crankcase 36 and oil sump 37. Cylinder-head cover 10 produced in particular from plastic comprises a gas inlet region 38 for oil-loaded blow-by-gas 17, an oil separator 11 with a vortex chamber 13 through which introduced blow-by-gas 17 flows, said vortex chamber being equipped to form a gas vortex 20, an oil separator 42 connected in parallel with vortex chamber separator 11 and comprising a spring tongue 41, a clean space 39 with oil drain 24 following the oil separators 11, 42, a pressure control valve 34 and a gas outlet region 40. The blow-by-gas is conveyed via channels (not shown), provided for example in the engine housing, from crankshaft housing 36 into cylinder-head cover 10.

FIGS. 2-4 show a preferred embodiment of vortex chamber oil separator 11 from FIG. 1. As shown in FIG. 2, chamber 13 is formed by an essentially tubular peripheral or lateral wall 14. A gas inlet opening 12 is provided in lateral wall 14. Provided around gas inlet opening 12 is a tubular gas inlet 18, which is disposed tangential to vortex chamber 13. Tubular gas inlet 18 generates a tangentially directed flow of the blow-by-gas entering through gas inlet opening 12 into chamber 13. The gas flow entering through gas inlet opening 12 is guided along chamber wall 14. On account of the flow component in longitudinal direction 21, a gas vortex 20 rotating helically about the longitudinal axis arises in chamber 13, without additional guide devices, such as for example guide plates or suchlike, being required. Helically means that the gas vortex forms at least one complete revolution, preferably at least two complete revolutions, in an average load range of the engine. Rotating gas vortex 20 is propagated overall in a longitudinal direction 21 of tubular chamber 13. Longitudinal direction 21 runs along the central axis of chamber 13 and can be constituted in sections, as can be seen for example from FIG. 2.

The centrifugal forces acting on the oil particles in gas vortex 20 bring about a separation of the oil particles through contact with peripheral wall 14 and coalescence of the oil particles becoming enriched in the outer region of chamber 13 to form oil droplets. The separated oil is drained along peripheral wall 14 of chamber 13 and is fed back by means of a return flow 24 into the engine oil circuit. In order to ensure the gravitational drainage of the oil without clearance volumes, the bottom of chamber 13 in the operational position preferably has a constant gradient up to oil drainage line 24. By means of a return shut-off element 41 represented for example in FIG. 1, the entry of blow-by-gas into clean space 26 through oil discharge line 24 in the reverse direction is prevented.

The characteristic of the efficiency or pressure loss of vortex chamber separator 11 as a function of the volume flow approximately corresponds to the characteristic of a cyclone with an immersion tube.

After passing through chamber 13, helical gas vortex 20 flows out at the distal end 22 of chamber 13, i.e. it transforms into a non-rotating flow, and emerges from chamber 13 through gas outlet opening 25 disposed at the distal end 22 of chamber 13. Cleaned blow-by-gas 23 is then conveyed, through a clean space 39, for example to pressure control valve 34 (see FIG. 1).

On account of the emergence of the gas flow out of vortex chamber 13 at distal end 22, an open construction of chamber 13 results. In particular, an injection-moulding tool used in the production of oil separator 11 can engage through gas outlet opening 25 into chamber 13. For this purpose, it is advantageous, as in FIG. 2, for the cross-section of chamber 13 to have a tapered portion between end 19 near the inlet and distal end 22, and for the area of gas outlet opening 25 preferably to be greater than or equal to the maximum cross-sectional area of chamber 13.

The open construction of vortex chamber 13 makes it possible for separated oil 27 to drain off from vortex chamber 13 through gas outlet opening 25 having a large cross-section (see FIG. 2). An oil drainage with a small cross-section, which exhibits an unfavorable freezing behavior, can thus be avoided. In other words, oil drainage line 24 preferably runs into clean space 39 and not into vortex chamber 13.

As can be seen from FIGS. 1 and 2, no flow reversal of the gas in the opposite direction occurs at distal end 22 of vortex chamber 13 according to the invention, unlike a cyclone with an immersion tube.

As shown in FIG. 2, chamber 13 preferably comprises, particularly in its inlet-side region, an essentially cylindrical section 15 in order that a stable gas vortex 20 can first be formed, with a preferred axial length of at least 0.5 times the diameter, more preferably in the range from 0.5 to 5 times, more preferably 1 to 3 times the diameter. Essentially cylindrical includes a conicity of several degrees, i.e. up to 10°, on account of an extraction bevel caused by production.

As shown in FIGS. 2 and 4, chamber 13 preferably comprises, particularly at least in its outlet-side region, a section 16 widening in longitudinal direction 21 so as to form a diffuser, in which the rotational speed of the gas diminishes and the probability is thus reduced of the draining liquid being entrained again by the outflowing gas vortex. At the same time, the pressure loss over separator 11 is reduced. With regard to the desired effect, the conicity of diffuser 16 preferably amounts to at least 10°, more preferably at least 20°, still more preferably at least 30°.

With the shaping of diffuser 16 which is oval in cross-section, as shown in FIGS. 2 and 4, gas vortex 20 first becomes separated from the lower edge of chamber 13, so that draining liquid 27 there has a considerably reduced gas contact and cannot therefore be entrained again by the gas flow. For this purpose, it is advantageous if chamber 13 is widened in the lower region to a greater extent than in the upper region, especially if chamber 13 widens only downwards but not in the upper region, as is the case for example in FIGS. 2 and 4.

In a preferred embodiment according to FIGS. 3 and 4, vortex chamber 13 has two tangentially contacting sub-chambers 13a, 13b preferably disposed in parallel with a jointly used gas inlet 18 for the formation of two counter-rotating gas vortices 20a, 20b disposed in parallel; it thus concerns a double chamber. Gas inlet 18 is preferably affected tangentially into the region of the tangential contact of the two sub-chambers 13a, 13b and is preferably directed onto the middle of a web 33, which serves as a flow divider. Sub-chambers 13a, 13b preferably lie (mirror-) symmetrical to gas inlet 18. Peripheral wall 14 of chamber 13 is therefore preferably formed omega- or ω-shaped, as shown in FIG. 3. Compared to a separator with only one gas vortex, the flow quantity of the separator can essentially be doubled with a relatively slightly larger overall height.

The invention is not however restricted to a specific number of gas vortices. In particular, embodiments with one gas vortex, such as described in application DE 10 2007 046 235.4, are also included. Embodiments with more than two parallel vortices are also conceivable.

In order to prevent gas contact with draining oil 27 as early as possible, it is possible, as described in application DE 10 2007 046 235.4, to provide in the lower part of vortex chamber 13 or diffuser 16 a drainage groove or, in the case of a plurality of sub-chambers 13a, 13b, one or more drainage grooves in peripheral wall 14, which are disposed beneath the periphery defined by peripheral wall 14.

The form of vortex chamber 13 in the longitudinal direction can be varied in diverse ways, as described in application DE 10 2007 046 235.4. In the example of FIG. 1, entire vortex chamber 13 is widened uniformly. An oil drainage opening leading to an oil drainage channel can also be provided in the bottom of vortex chamber 13, a separation of gas vortex 20 and draining oil 27 for example being affected by means of a partition wall. Separated oil 27 is thus effectively prevented from being taken up again by gas vortex 20.

Figure 5:
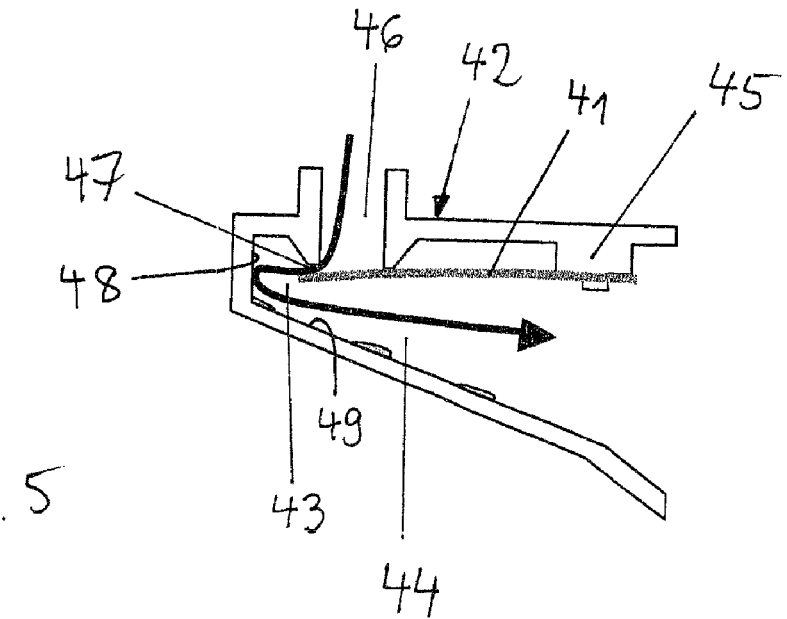
FIG. 5 shows a longitudinal section through the oil separator with an inlet-side spring tongue from FIG. 1.

In cylinder-head cover 10 shown in FIG. 1, there is connected in parallel to vortex chamber oil separator 11 at least one further oil separator 42, which comprises a separation chamber 43 with an input-side spring tongue 41 acted on by blow-by-gas. Spring-tongue oil separator 42 is shown in detail in FIG. 5. Spring tongue 41 is assigned to oil separator 42 and is essentially disposed in separation chamber 43, and opens inwards. Spring tongue 41 is clamped in a cantilever manner at one end in a clamping device 45. The other end of spring tongue 41 covers, in the rest position, gas inlet opening 46 of oil separator 42, which opening can for example be circular. The free end of spring tongue 41 is acted on by oil-loaded blow-by-gas 17. On account of the pressurization, spring tongue 41 frees a gap 47, through which the blow-by-gas flows at high speed into downstream separation chamber 43.

Provided in separation chamber 43 is a baffle wall 48, which expediently has a predominantly perpendicular component with respect to spring tongue 41 in the rest position and is preferably orientated approximately perpendicular to spring tongue 41 in the rest position. Approximately perpendicular means at an angle in the range from 70° to 110°, preferably in the range from 80° to 100°. The gas flow entering through gap 47 thus runs approximately perpendicular onto baffle wall 48 and is deflected along baffle wall 48. On account of the inertia of the oil and dirt particles in the blow-by-gas, the latter are separated at baffle wall 48. In order to achieve the highest possible separation effect, the gas flow is conveyed away through a downstream outlet chamber 44 in such a way that a deflection of the gas flow in the opposite direction to the flow direction through gap 47 into separation chamber 43 takes place at the baffle wall. The deflection of the gas flow preferably amounts to more than 120°, and more preferably to more than 150° up to approx. 180°, as can be seen from FIG. 5.

The greater the gas pressurization of spring tongue 41, the greater is gap 47 freed by spring tongue 41 for the blow-by-gas in the usual working range. On account of this adaptive behavior, spring-tongue oil separator 42 exhibits an approximately linear flow characteristic or pressure-loss characteristic over a large volume-flow range, in particular also with comparatively high volume flows of up to 200 l/min. Oil separator 42 with input-side spring tongue 41 thus ensures a reduced pressure loss with a high degree of separation also with high volume flows at which the pressure loss in vortex chamber separator 11 increases disproportionately or exponentially.

The oil separated at baffle wall 48 is drained at bottom 49 of separation chamber 43 and downstream outlet chamber 44 and is fed back into the engine oil circuit by means of return flow 24. In order to ensure the gravitational drainage of the oil without clearance volumes, the bottom of chambers 43, 44 in the operational position preferably has a constant gradient up to oil drainage line 24.

Downstream outlet chamber 44 preferably widens in the longitudinal direction in order to form a diffuser, in which the flow rate of the gas diminishes and the probability is thus reduced of the draining liquid being entrained again by the outflowing gas flow. At the same time, the pressure loss over separator 42 is reduced. With regard to the desired effect, the conicity of diffuser 44 preferably amounts to at least 10°, more preferably at least 20°, still more preferably at least 30°.

Figure 6:
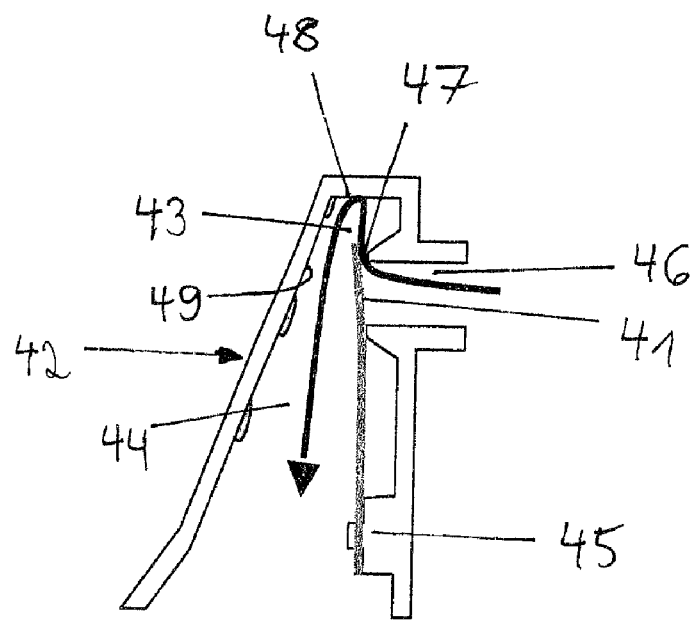
FIG. 6 shows a longitudinal section through an oil separator with an inlet-side spring tongue in another embodiment.

The embodiment according to FIG. 6 concerns a vertical arrangement of spring-tongue separator 42 in contrast with the—in terms of a reduced overall height—preferred essentially horizontal installation position according to FIGS. 1 to 5. Since the emulsion occurring in the vertical arrangement can flow away better, the latter is preferred with regard to the freezing behavior. Depending on the application, separators with an inclined installation position of separator 42 are also possible.

As described in application DE 10 2007 046 235.4, a vertical or inclined arrangement of vortex chamber 13 is also possible.

The invention is not restricted to two oil separators connected in parallel. Further separators connected in parallel and/or in series can also be provided, where these can be vortex chamber and/or spring-tongue oil separators. The term spring-tongue oil separator is not restricted to oil separators with an inlet-side spring tongue. One or more additional vortex chamber separators can for example also be provided with a distal spring-tongue valve. A cylinder-head cover in an embodiment not shown comprises an oil separator omega- or ω-shaped in cross-section, as described above, and two or more oil separators connected in parallel each having an inlet-side spring tongue, respectively. In the case of a plurality of spring-tongue oil separators, each spring-tongue oil separator is preferably provided with its own spring tongue.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An oil separator arrangement for an internal combustion engine, comprising a vortex chamber oil separator with a vortex chamber extending in a longitudinal direction, said vortex chamber comprising a wall extending in a longitudinal direction, a gas inlet, and a gas outlet opening, said gas inlet being disposed tangential to said wall for tangentially blowing-in of blow-by-gas into said vortex chamber, so that at least one gas vortex flow rotating helically along said wall in said longitudinal direction is generated, wherein at least one further oil separator is connected in parallel to said vortex chamber oil separator, wherein each said at least one further oil separator comprising a separation chamber with a second gas inlet and an inlet-side spring tongue automatically controlled by the applied blow-by-gas, and a baffle wall disposed downstream of the spring tongue, wherein the inlet-side spring tongue comprises a leaf spring clamped in a cantilever manner at a first end, wherein the inlet-side spring tongue is arranged inside the separation chamber, wherein the inlet-side spring tongue is arranged such that blow-by-gas entering through the second gas inlet into the separation chamber is deflected around a second end of the leaf spring through an opening gap such that particles contained in the blow-by-gas flow are separated from the blow-by-gas flow, such that oil separation in the at least one further oil separator is effected by the spring tongue.

2. The oil separator arrangement according to claim 1, wherein said spring tongue in an unloaded state covers the second gas inlet opening of said separation chamber.

3. The oil separator arrangement according to claim 1, wherein said spring tongue creates the opening gap when blow-by-gas is applied.

4. The oil separator arrangement according to claim 3, wherein the gap width of said opening gap depends on the blow-by-gas pressure acting on the spring tongue.

5. The oil separator arrangement according to claim 1, wherein said spring tongue opens inwards into the separation chamber.

6. The oil separator arrangement according to claim 1, wherein the blow-by-gas is deflected at said baffle wall.

7. The oil separator arrangement according to claim 1, wherein an outlet chamber widening in the flow direction is arranged downstream of said separation chamber.

8. The oil separator arrangement according to claim 1, wherein said vortex chamber is round or oval in cross-section.

9. The oil separator arrangement according to claim 1, wherein said vortex chamber separator is free of control means for a controlled changing of the flow resistance.

10. The oil separator arrangement according to claim 1, wherein said gas outlet opening is disposed in the region of a distal end of said vortex chamber.

11. The oil separator arrangement according to claim 1, wherein said vortex chamber comprises a section widening towards a distal end.

12. The oil separator arrangement according to claim 1, wherein said vortex chamber comprises an essentially cylindrical section in the region of said gas inlet.

13. The oil separator arrangement according to claim 1, wherein said vortex chamber comprises a plurality of sub-chambers for forming a plurality of gas vortices.

14. The oil separator arrangement according to claim 1, wherein the vortex chamber is omega-/ω-shaped in a cross-section through the gas inlet.

15. The oil separator arrangement according to claim 1, wherein a groove for draining off the oil is provided in a bottom of the vortex chamber.

16. A cylinder-head cover for an internal combustion engine with an integrated oil separator arrangement, comprising a vortex chamber oil separator with a vortex chamber extending in a longitudinal direction, said vortex chamber comprising a wall extending in a longitudinal direction, a gas inlet, and a gas outlet opening, said gas inlet being disposed tangential to said wall for tangentially blowing-in of blow-by-gas into said vortex chamber, so that at least one gas vortex flow rotating helically along said wall in said longitudinal direction is generated, wherein at least one further oil separator is connected in parallel to said vortex chamber oil separator, wherein each said at least one further oil separator comprising a separation chamber with a second gas inlet and an inlet-side spring tongue automatically controlled by the applied blow-by-gas, and a baffle wall disposed downstream of the spring tongue, wherein the inlet-side spring tongue comprises a leaf spring clamped in a cantilever manner at a first end, wherein the inlet-side spring tongue is arranged inside the separation chamber, wherein the inlet-side spring tongue is arranged such that blow-by-gas entering through the second gas inlet into the separation chamber is deflected around a second end of the leaf spring through an opening gap such that particles contained in the blow-by-gas flow are separated from the blow-by-gas flow, such that oil separation in the at least one further oil separator is effected by the spring tongue.

17. The cylinder-head cover according to claim 16, wherein said spring tongue in an unloaded state covers the second gas inlet opening of said separation chamber.

18. The cylinder-head cover according to claim 16, wherein said spring tongue creates the opening gap when blow-by-gas is applied.

19. The cylinder-head cover according to claim 18, wherein the gap width of said opening gap depends on the blow-by-gas pressure acting on the spring tongue.

20. The cylinder-head cover according to claim 16, wherein said spring tongue opens inwards into the separation chamber.

21. The cylinder-head cover according to claim 16, wherein the blow-by-gas is deflected at said baffle wall.

22. The cylinder-head cover according to claim 16, wherein said vortex chamber separator is free of control means for a controlled changing of the flow resistance.

23. The cylinder-head cover according to claim 16, wherein said gas outlet opening is disposed in the region of a distal end of said vortex chamber.

24. The cylinder-head cover according to claim 16, wherein said vortex chamber comprises a plurality of sub-chambers for forming a plurality of gas vortices.

25. The cylinder-head cover according to claim 16, wherein the vortex chamber is omega-/ω-shaped in a cross-section through the gas inlet.

* * * * *